United States Patent [19]
Johnson et al.

[11] 3,777,489
[45] Dec. 11, 1973

[54] COMBUSTOR CASING AND CONCENTRIC AIR BLEED STRUCTURE

[75] Inventors: Kenneth O. Johnson, Indian Hill; Peter F. Kepf, New Richmond; Alfred St. George, West Chester, all of Ohio

[73] Assignee: General Electric Company, Cincinnati, Ohio

[22] Filed: June 1, 1972

[21] Appl. No.: 258,884

[52] U.S. Cl. ............... 60/226 R, 60/39.07, 415/144
[51] Int. Cl. ............................ F02c 3/12, F02k 3/06
[58] Field of Search ..................... 60/39.07, 39.31, 60/39.36, 226 R, 39.18 C; 415/144, 145

[56] References Cited
UNITED STATES PATENTS

| | | | |
|---|---|---|---|
| 3,597,106 | 8/1971 | Anderson | 415/144 |
| 3,394,543 | 7/1968 | Slattery | 60/39.07 |
| 2,986,231 | 5/1961 | Hellstrom | 60/39.07 |
| 2,863,288 | 12/1958 | Martin | 415/145 |
| 2,682,363 | 6/1954 | Lombard et al. | 60/39.07 |

*Primary Examiner*—Carlton R. Croyle
*Assistant Examiner*—Robert E. Garrett
*Attorney*—Derek P. Lawrence et al.

[57] ABSTRACT

Combustor casing and bleed structure provides a concentric flow path for compressor discharge and intermediate stage air from a turbofan engine compressor to an outer cowling defining the fan flow path. Concentric tubes are respectively mounted to a support cone, which includes a plurality of outlet guide vanes, and to an outer casing, which partially defines the fan flow path. External piping is thus limited to the concentric tubes and potential losses due to interference with the fan flow are avoided.

10 Claims, 2 Drawing Figures

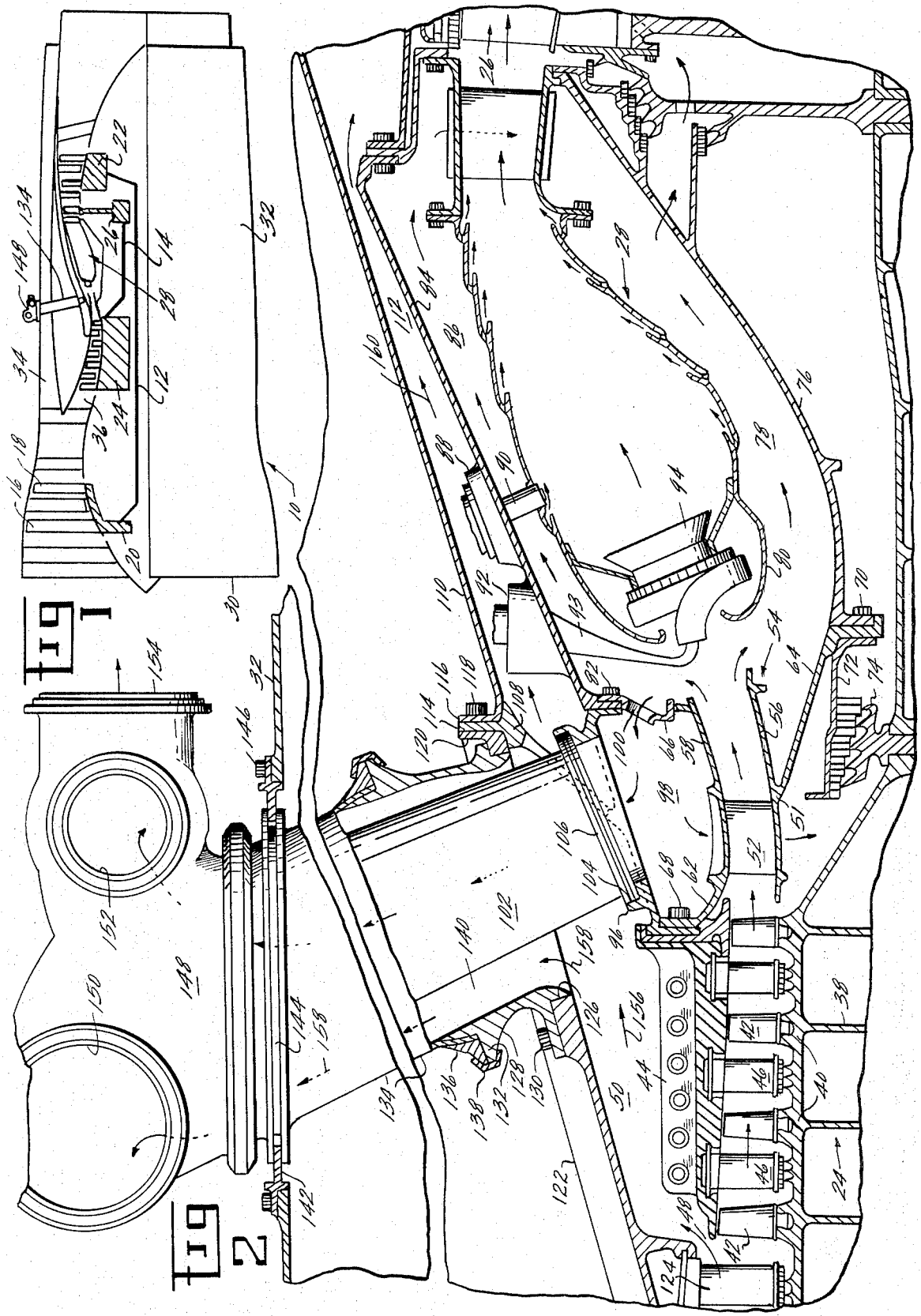

3,777,489

COMBUSTOR CASING AND CONCENTRIC AIR BLEED STRUCTURE

BACKGROUND OF THE INVENTION

This invention relates to gas turbine engine casing structures and, more particularly, to such structures which are adapted for bleeding both interstage compressor air and compressor discharge air through concentric bleed tubes.

The invention herein described was made in the course of or under a contract, or a subcontract thereunder, with the United States Department of the Air Force.

It is often desirable that an aircraft gas turbine engine include a compressor structure which permits bleeding of high pressure air from between two of the latter stages of the compressor to provide pressurized air for operation of airframe accessories, engine accessories, or engine or aircraft de-icing systems. In many cases, it is also desirable to include structure which permits bleeding of even higher pressure air at the discharge of the compressor to provide pressurized air for cooling downstream turbine components. Preferably, both the interstage bleeding and the compressor discharge bleeding are accomplished by means which provide minimal interference with the normal air flow patterns in the compressor. Furthermore, the casing/bleed structure should provide minimal engine frontal area penalties and should not add complexity to the assembly of such an engine.

In the case of a turbofan engine, the above requirements are applicable to the core engine portion of the turbofan. Because the outer casing of the core engine normally provides the inner bounds of a portion of the fan flow path, the cooling/bleed structure must be such that it provides a minimum obstruction to the fan flow path. For this reason, it is desirable that a significant portion of the bleed air be delivered to downstream components without the necessity of external piping, which would lie within the fan flow path. In addition, where external piping must be provided to deliver bleed air to airframe systems, engine accessories, de-icing systems, etc., it is desirable that this piping be limited to a single location within the flow path.

Because of the diverse uses for the interstage bleed and compressor discharge bleed air, any bleed structure must also be capable of maintaining separation between the two sources of bleed air at all times. By maintaining complete separation between the two sources of bleed air, the user has the added advantage of being able to switch from one source to the other during different portions of the aircraft flight regime, thereby minimizing detrimental performance effects associated with any bleed system. In order to maintain this separation while providing minimum obstruction to the fan flow, it is desirable that the bleed structure which must lie within the fan flow path consist of concentric tubing capable of delivering the two sources of bleed air to external fittings provided on the engine external casing.

SUMMARY OF THE INVENTION

It is an object of this invention, therefore, to provide combustor casing and air bleed structure capable of segregating interstage and compressor discharge bleed air and delivering the same to external systems with minimum interference to the fan flow path.

Briefly stated, the above and similarly related objects are attained by providing an engine casing structure which consists of three basic components: an outer casing, a combustor casing, and a support cone. The outer casing forms a portion of the inner bounds of the fan flow path and cooperates with the diffuser casing to define an interstage bleed cooling air passageway. The outer casing also includes a mounting bracket for an interstage bleed pipe, which extends through the fan flow path and provides interstage bleed air to a fitting mounted externally of the engine. The combustor casing, in addition to defining the interstage flow path, further provides the outer bounds of a combustion cooling flow path. The support cone partially defines an annulus which receives compressor discharge air and also provides a mounting pad for tubing which is concentric with and lies within the interstage bleed tubing and delivers the compressor discharge air to a second fitting mounted externally of the engine. The support cone also provides support for an integral diffuser/outlet guide vane casting which defines the flow path from the compressor to the combustor.

BRIEF DESCRIPTION OF THE DRAWINGS

While the specification concludes with a series of claims which particularly point out and distinctly claim the subject matter which applicants consider to be their invention, a complete understanding of the invention will be gained from the following description which is given in connection with the accompanying drawings, in which:

FIG. 1 is a greatly simplified schematic view, taken partially in section, of a turbofan engine incorporating the present invention; and FIG. 2 is an enlarged detailed drawing, taken partly in section, with portions broken away, of the combustor casing and concentric bleed ports which form the present invention.

DESCRIPTION OF A PREFERRED EMBODIMENT

Referring to the drawings wherein the numerals correspond to like elements throughout, attention is directed initially to FIG. 1 wherein a turbofan engine 10 is shown to include a fan rotor 12 and a core engine rotor 14. The fan rotor 12 includes a plurality of fan blades 16 and 18 mounted for rotation on a disc 20. The fan rotor 12 also includes a low pressure or fan turbine 22, which drives the fan disc 20 in a well-known manner. The core engine rotor 14 includes a compressor 24 and a power, or high pressure, turbine 26 which drives the compressor 24. The core engine also includes a combustion system 28, the details of which are shown most clearly in FIG. 2.

In operation, air enters the gas turbine engine 10 through an inlet 30 provided by means of a suitable cowling 32 which surrounds the fan rotor 12 and core engine rotor 14 and provides the external casing for the engine. Air entering the inlet 30 is compressed by means of the rotation of the fan blades 16 and 18 and thereafter is split into two flow streams, a bypass stream or passageway 34 and a core engine stream or passageway 36.

The pressurized air which enters the core engine passageway 36 is further pressurized by means of the compressor 24 and is thereafter ignited along with high energy fuel in the combustion system 28. This highly energized gas stream then flows through the turbine 26 to drive the compressor 24 and thereafter through the turbine 22 to drive the fan rotor disc 20.

The pressurized air flowing through the bypass passageway 34 is either mixed with the core engine exhaust stream by means of a suitable mixer (not shown) or is allowed to exhaust to ambient conditions as a relatively low velocity, low pressure stream surrounding the core engine exhaust. In either case, the core engine exhaust and the fan bypass exhaust provide a propulsive force for an aircraft powered by the turbofan engine 10.

It should be noted that although the present description is limited to an aircraft gas turbine engine, the present invention may be applicable to any gas turbine engine power plant such as those utilized for marine and industrial usage. The description of the engine shown in FIG. 1 is thus merely illustrative of the type of engine to which the present invention is applicable.

Referring now to FIG. 2, the details of the inventive combustor casing and air bleed structure are shown in an enlarged cross-sectional view of the downstream portion of the compressor 24, the initial stage of the turbine 26, and the combustion system 28. As shown therein, the compressor 24 includes a rotor 38 having a number of rotor stages 40 which carry a plurality of individual rotor blades 42. The compressor 24 further includes a casing structure 44, which defines the outer bounds of the compressor flow path and includes mounting provisions for a plurality of stator vanes 46 aligned in individual stages between each stage of the rotor blades 42.

The compressor casing structure 44 provides an annular orifice 48 immediately upstream of one of the intermediate stages of rotor blades 42 for bleeding interstage air from the interior of the compressor 24. This interstage bleed air is then delivered to an annular plenum 50 which surrounds the compressor casing structure 44. A detailed description of the compressor casing structure 44 is given in U.S. Pat. No. 3,597,106 - Anderson, assigned to the same assignee as the present application.

As further shown in FIG. 2, located immediately downstream of the last stage of compressor rotor blades 42 is an integral diffuser/outlet guide vane casting 51 which includes a cascade of compressor outlet guide vanes 52 to direct the compressor discharge flow to a step diffuser 54 comprised of inner diffuser wall 56 and outer diffuser wall 58.

The inner and outer diffuser walls 56 and 58 form the downstream flow portion of the diffuser casting 51, which further includes generally conical-shaped extending arms 62, 64, and 66. As shown in FIG. 2, each of the conical arms 62, 64 and 66 is connected in any suitable manner to other stationary components of the combustion system. For example, the arm 62 is bolted by means of bolts 68 to the downstream end of the compressor casing structure 44, while the arm 64 is bolted by means of bolts 70 to a stationary shroud portion 72 of a seal 74 and also to an inner combustor casing 76. The inner combustor casing 76 extends downstream from the conical arm 64 to provide a cooling flow path 78 around a combustor 80, the structure of which forms no portion of the present invention.

The conical arm 66 is connected by means of bolts 82 to an outer combustor casing 84 which cooperates with the combustor 80 to provide an outer cooling flow path 86. The outer combustor casing 84 includes a mounting pad 88 for an igniter 90 of the combustor 80 and also includes a fuel injector pad 92, to which are mounted a number of fuel tubes 93 which deliver fuel to fuel injector means 94 of the combustor 80.

As further shown in FIG. 2, the conical arm 62 and the conical arm 66 incude provisions for mounting a support cone 96 thereto which surrounds the diffuser casting 51 and defines a plenum 98 above the cascade of outlet guide vanes 52. For purposes which will become apparent, the arm 66 includes a plurality of orifices 100 which permit air flowing from the diffuser 54 to enter the plenum 98.

The support cone 96 shown in FIG. 2 includes means for mounting tubing 102 thereto. In the present example, these means take the form of an internally threaded opening 104 which receives an externally threaded end 106 of the tubing 102.

The support cone 96 also includes a conical extension 108, which protrudes outwardly therefrom and to which is mounted an outer engine casing 110. The casing 110 surrounds the outer combustor casing 84 and cooperates therewith to form an intermedaite compressor bleed cooling air passageway 112.

As shown in FIG. 2, a radially extending rib portion 114 of the conical extension 108 is connected to a flange 116 at the upstream end of the outer engine casing 110 by means of a plurality of bolts 118. Likewise, a flange 120, which forms the downstream end of compressor casing 122 is connected to the casing 110 by means of the bolts 118. The upstream portion of the compressor casing 122 defines the outer flow path bounds for the core engine compressor 24 and provides support for a number of rows of the upstream compressor stator vanes, one stage of which is identified by the numeral 124 in FIG. 2. The compressor casing 122 includes an opening 126, which is located near the downstream end thereof. The opening 126 is adapted to receive a support tube 128, which is rigidly connected to the compressor casing 122 in any desired manner, such as by means of bolts 130.

The support tube 128 includes a lip 132 located near the outer end thereof which provides support for tubing 134, which surrounds the support tube 128 and extends outwardly therefrom. The tubing 134 is connected to the support tube 128 in any suitable mamner. For example, as shown in FIG. 2, the tubing 134 may be connected to the support tube 128 by means of a collar 136 and a V-band clamp 138.

As shown in FIG. 1, the tubing 134 extends from the compressor casing 122 to the outer cowling 32 which surrounds the turbofan engine 10. As also shown therein, the tubing 134 extends through the bypass passageway 34. As shown in FIG. 2, the tubing 134 surrounds the tubing 102 which extends from the support cone 96 to the outer cowling 32. The tubing 134 and the support tube 128 have a larger internal diameter than the outer diameter of the tubing 102. In this manner the tubing 102 and the tubing 134 cooperate to define a passageway 140, which permits the flow of air from the plenum 50 to the outer cowling 32 of the engine 10. As previously discussed, the plenum 50 is fed with interstage bleed air by means of the orifice 48. Thus, the passageway 140 permits the delivery of interstage bleed air to the outer cowling of the engine 10.

As further shown in FIG. 2, the tubing 134 is connected at its outer end to the cowling 32 by means of a sleeve 142 which surrounds a collar 144 formed at the outer end of the tubing 134. The sleeve 142 is connected to the cowling 32 by means of bolts 146. A concentric bleed fitting 148 is also connected to the cowling 32 and the outer end of the tubing 134 and the tubing 102 in any suitable manner. The structure of the concentric bleed fitting 148 forms no portion of the present invention, however the fitting 148 is capable of segregating the flow exiting through the tubing 102 and the tubing 134 and is further capable of delivering the completely separated flows to the aircraft system through outlets 150, 152 and 154.

As previously mentioned, the tubing 102 provides for the delivery of air within the plenum 98 to the fitting 148. Compressor discharge air enters the plenum 98 through the plurality of orifices 100 located within the conical arm 66 of the diffuser casting 51. Thus, compressor discharge air flows from the step diffuser 54 to the plenum 98 and thus to the fitting 148 via the tubing 102.

Applicants have thus provided a concentric bleed system wherein interstage bleed air and compressor discharge bleed air are supplied to an external fitting through concentric tubes which extend from the downstream end of the compressor to the outer cowling of the turbofan engine 10.

While the operation of the above described structure should be readily apparent from the above description, a brief description thereof will be given in order to enable discussion of the benefits provided by such structure. Air entering the turbofan engine 10 through the inlet 30 is pressurized by the fan rotor 20. A portion of this pressurized air then flows through the core engine compressor 24 wherein it is further pressurized prior to being ignited along with high energy fuel in the combustion system 28. As shown in FIG. 2, a portion of the compressed motive fluid flows through the annular orifice 48 into the plenum 50 which surrounds the compressor casing structure 44. This interstage bleed air then flows downstream in the direction of arrows 156. A portion of this interstage bleed air then flows through the passageway 140 in the direction of arrows 158, while the remaining portion thereof flows through the interstage cooling passageway 112 in the direction of arrows 160. That portion of the cooling air which flows in the direction of arrows 158 is delivered to the fitting 148 as previously described from whence it is delivered to the aircraft system for any required purpose. That portion of the interstage bleed air which flows through the cooling passage 112 not only cools the outer casing 110 and the combustor outer casing 84 but is thereafter utilized to cool downstream turbine stator components (not shown) in a manner well known in the art.

That portion of the air flow passing through the compressor 24 which does not enter the orifice 48 flows downstream through the later stages of the compressor and is further pressurized thereby. This air then flows through the compressor outlet guide vanes 52 and enters the step diffuser 54. A first portion of the compressor discharge air is delivered to the fuel injecting means 84 of the combustor system 28, while other portions thereof flow around the combustor through passageways 78 and 86 to cool the combustor and thereafter cool downstream turbine components. The remaining portion of the compressor discharge air flows through the orifices 100 and pressurizes the plenum 98. This portion of the compressor discharge air is then delivered either through the cascade of outlet guide vanes 52 to pressurize the seal 74 or through the tubing 102 to the fitting 148 as previously described. That portion of the compressor discharge air which is delivered through the tubing 102 to the fitting 148 is thereafter utilized for any desired purpose, such as anti-icing. etc. anti-icing.

A number of additional advantages are provided by the above-described structure in that a dual outer casing is provided around the entire combustor system. That is, both the combustor outer casing 84 and the engine outer casing 110 surround the entire combustor system. This dual outer casing structure permits greater load sharing and improves thermal matching because of the dual cooling passages 86 and 112. In addition, the dual outer casing provides extremely low external skin temperatures which improve fire safety and also reduce the pressure differential across both the casing 84 and the outer engine casing 110. This permits both of these casing structures to be made as lighter weight structures than those normally associated with a single casing system.

What we claim is:

1. In a gas turbine engine which includes an axial flow, multistage compressor, a combustor and a turbine, compressor air bleed structure comprising:
    a first air delivery tube,
    a second air delivery tube, concentric with and surrounding said first tube so as to define a passageway between the outer surface of said first tube and the inner surface of said second tube,
    means for delivering air from the discharge end of the compressor to said first tube,
    means for delivering air from an intermediate stage of the compressor to said second tube, and
    means for preventing flow between said first tube and said second tube.

2. Compressor air bleed structure as recited in claim 1 wherein the gas turbine engine comprises a turbofan engine having an outer cowling which defines the inner bounds of a fan flow path which surrounds said compressor, and said first and second tubes each extend from the compressor to the outer cowling.

3. Compressor air bleed structure as recited in claim 1 further including a support cone located at the downstream end of the compressor, and said first tube is mounted to said support cone.

4. Compressor air bleed structure as recited in claim 3 wherein said support cone additionally supports an integral diffuser/outlet guide vane casting adapted to receive air from the discharge end of the compressor and deliver same to the combustor.

5. Compressor air bleed structure as recited in claim 4 wherein said diffuser casting includes at least one diffuser wall which defines a portion of a flow path for the compressor discharge flow, and said support cone surrounds said diffuser wall and thereby defines an annular plenum which receives a portion of the air flowing from the discharge end of the compressor.

6. Compressor air bleed structure as recited in claim 5 wherein the gas turbine engine comprises a turbofan engine having an outer cowling which defines the inner bounds of a fan flow path which surrounds said compressor, and said first and second tubes each extend from the compressor to the outer cowling.

7. Compressor air bleed structure as recited in claim 6 wherein the turbofan engine additionally includes an outer casing means which partially surrounds the compressor and defines a portion of the fan flow path, and said second tube is mounted to said outer casing means.

8. Compressor air bleed structure as recited in claim 7 wherein the turbofan engine includes a combustor casing which surrounds the combustor, and said combustor casing and said outer casing means cooperate to define a passageway for said intermediate stage air.

9. Compressor air bleed structure as recited in claim 5 wherein said diffuser casting further includes at least one conical-shaped extending arm, said arm is connected to and extends from said diffuser wall, and said arm is provided with at least one orifice adapted to permit a portion of the compressor discharge flow to pass to said plenum.

10. Compressor air bleed structure as recited in claim 9 wherein said outer casing means is mounted to said arm.

* * * * *